(12) United States Patent
Kim et al.

(10) Patent No.: US 8,532,716 B2
(45) Date of Patent: Sep. 10, 2013

(54) ELECTRIC POWER CONTROL METHOD AND MOBILE DEVICE ADAPTED THERETO

(75) Inventors: Hee Jin Kim, Gyeonggi-do (KR); Gi Bae Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 169 days.

(21) Appl. No.: 13/049,174

(22) Filed: Mar. 16, 2011

(65) Prior Publication Data
US 2011/0263294 A1    Oct. 27, 2011

(30) Foreign Application Priority Data
Apr. 21, 2010 (KR) ........................ 10-2010-0036763

(51) Int. Cl.
*H04M 1/00* (2006.01)

(52) U.S. Cl.
USPC ........................................ 455/572; 455/558

(58) Field of Classification Search
USPC ........................................ 455/572
See application file for complete search history.

(56) References Cited

U.S. PATENT DOCUMENTS

| | | | | |
|---|---|---|---|---|
| 5,157,247 A * | 10/1992 | Takahira | ........................ | 235/492 |
| 5,568,441 A * | 10/1996 | Sanemitsu | ...................... | 365/229 |
| 2001/0016502 A1 * | 8/2001 | Shirai | ............................ | 455/558 |
| 2006/0264188 A1 * | 11/2006 | Mars et al. | .................. | 455/127.1 |
| 2009/0021228 A1 * | 1/2009 | Carr et al. | ...................... | 323/266 |
| 2009/0156144 A1 * | 6/2009 | Hsu | ................................ | 455/142 |
| 2009/0156258 A1 * | 6/2009 | Yang | ............................. | 455/558 |
| 2010/0130263 A1 * | 5/2010 | Zhang et al. | .................. | 455/572 |
| 2011/0215644 A1 * | 9/2011 | Baker et al. | ..................... | 307/64 |

FOREIGN PATENT DOCUMENTS
KR      1999-051189     7/1999

* cited by examiner

*Primary Examiner* — Charles Appiah
*Assistant Examiner* — Mazda Sabouri
(74) *Attorney, Agent, or Firm* — Cha & Reiter, LLC

(57) ABSTRACT

An electric power control method and a mobile device adapted thereto are provided that stores power for subsequent provision to a Subscriber Identity Module (SIM). In exemplary operation, both an RF communication unit and a charging unit are operative. The charging unit is coupled to a SIM electric power supply and the SIM. Upon occurrence of a voltage drop in the electric power supplied to the SIM, there is a switch to the charging unit to supply the charged electric power to the SIM.

14 Claims, 6 Drawing Sheets

ELECTRIC POWER CONTROL METHOD AND MOBILE DEVICE ADAPTED THERETO

CLAIM OF PRIORITY

This application claims priority from Korean Patent Application No. 10-2010-0036763 filed Apr. 21, 2010, the contents of which are hereby incorporated by reference in its entirety.

BACKGROUND OF THE INVENTION

1. Field of the Invention

The present invention relates to electronic communication systems. More particularly, the present invention is related to a method and apparatus for stably controlling electric power in a mobile device having a Subscriber Identity Module (SIM).

2. Description of the Related Art

Mobile devices such as mobile communication terminals, Personal Digital Assistants (PDAs), etc. have been widely used because they can be easily carried about and provide a variety of functions. For example, mobile communication terminals are equipped with modules for supporting mobile communication that can perform transmission and reception of voice signals and data between mobile communication terminals via a base station. These devices each include a CPU, a memory, and other components, and are operated by an Operation System installed thereto. In addition, there can be a variety of applications based on the OS. Particularly in the case of PDAs, the capabilities include performing information collection, storage, writing operations, search operations, etc.

Conventional mobile devices support a mobile communication function or a particular user function using applications stored in their storage unit. Conventional mobile devices are operated using a Subscriber Identity Module (SIM) that can provide compatibility between mobile devices when the user replaces his/her mobile device with another. Such conventional SIM-based mobile devices have problems in that they frequently experience fluctuation in electric power provided from their power source during operation. In order to support a mobile communication function, the conventional SIM-based mobile devices must supply power that exceeds a certain level to the RF communication unit in order to search for a base station. However, in certain situations, a case occurs where the conventional SIM-based mobile devices may consume a large amount of power during search operations. In that case, the conventional SIM-based mobile devices cannot supply the usual amount of power to the SIM, and thus cannot perform normal data communication with the SIM.

SUMMARY OF THE INVENTION

The invention has been made to provide a method and apparatus for stably controlling the supply of power in a mobile device having a Subscriber Identity Module (SIM).

The invention further provides a mobile device adapted to the power control method.

In accordance with an exemplary embodiment of the invention, a method for controlling electric power in a mobile device preferably includes: receiving electric power from an electric power source to a Subscriber Identity Module (SIM), and changing a charging unit located between the electric power source and the SIM; a voltage drop occurring in the electric power supplied to the SIM; and supplying the charged electric power to the SIM according to the occurrence of a voltage drop.

In accordance with another exemplary embodiment of the invention a mobile device preferably includes: an electric power source; a power amplifier module for receiving electric power from the electric power source and distributing it; a Subscriber Identity Module (SIM) electric power supply for receiving electric power from the electric power source and outputting it to an SIM; a controller for communicating with the SIM and providing a user function, using the electric power output from the power amplifier module; and a charging unit, installed in the SIM electric power supply, for storing a certain amount of electric power output from the electric power source, and for providing the stored electric power to the SIM according to the state of the SIM.

BRIEF DESCRIPTION OF THE DRAWINGS

The features and advantages of the present invention will become more apparent from the following detailed description in conjunction with the accompanying drawings, in which.

DETAILED DESCRIPTION

Figure 1:
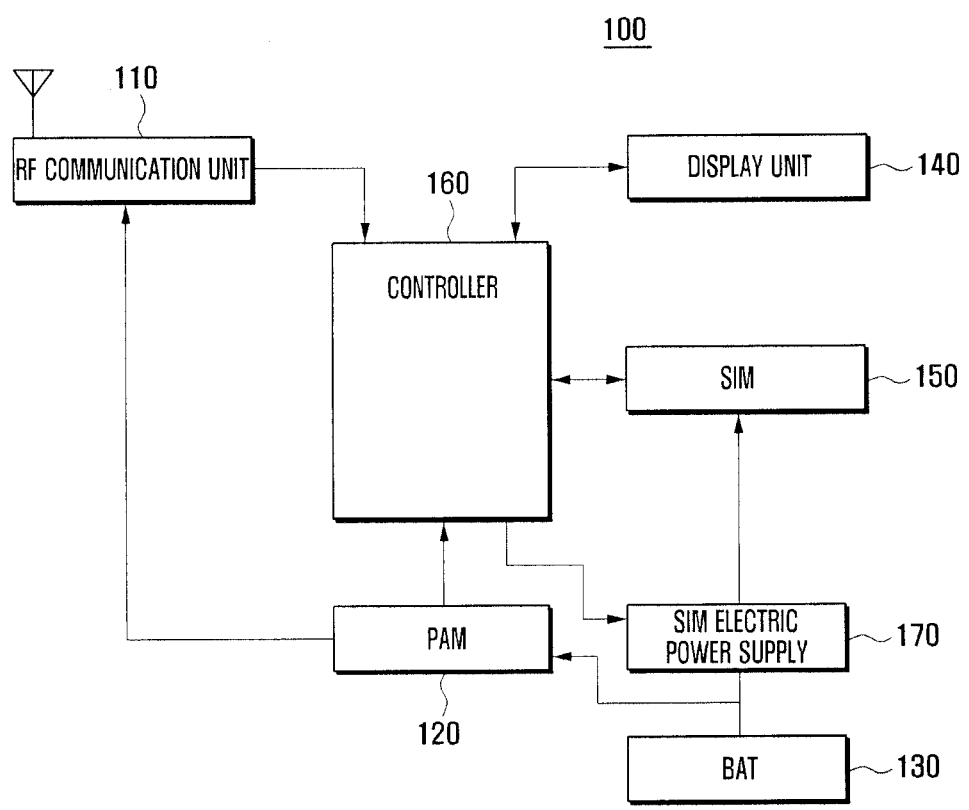
FIG. 1 illustrates a schematic block diagram of a mobile device according to an exemplary embodiment of the invention.

Hereinafter, exemplary embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring appreciation of the subject matter of the presently claimed invention with such well-known functions and structures.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the exemplary embodiments disclosed in the description and configurations illustrated in the drawings are only preferred exemplary embodiments, instead there may be various modifications, alterations, and equivalents thereof to replace the exemplary embodiments at the time of filing this application.

FIG. 1 illustrates a schematic block diagram of a mobile device 100 according to an exemplary embodiment of the invention.

Referring now to FIG. 1, the mobile device 100 according to an exemplary embodiment of the present invention preferably includes an RF communication unit 110, a power amplifier module 120, an electric power source 130, a display unit 140, a Subscriber Identity Module (SIM) 150, an SIM electric power supply 170 and a controller 160. A person of ordinary skill in the art appreciates that a means for coupling to the power source (wire, bus bar, etc.) is presented by the lines between the battery and the SIM electric power supply 170 or the power amplifier module 120.

The mobile device 100 having the components listed above can control the SIM electric power supply 170 to provide a stable flow of electric power to the SIM 150, thereby avoiding fluctuations in the electric power that may occur in certain situations, and this allows the SIM 150 and the controller 160 to perform normal data transmission and reception. In the following description, the components included in the mobile device 100 are explained in detail.

The RF communication unit 110 preferably establishes a communication channel for a voice call and a communication channel for transmitting data, such as video data, etc., under the control of the controller 160. That is, the RF communication unit 110 establishes a voice call channel, a data communication channel, and a video call channel with an external mobile communication system. To this end, the RF communication unit 110 preferably includes an RF transmitter for up-converting the frequency of signals to be transmitted and amplifying the signals and an RF receiver for low-noise amplifying received RF signals and down-converting the frequency of the received RF signals.

In an exemplary embodiment of the invention, the RF communication unit 110, which can be adapted to virtually any known format, is adapted to Time Division Multiple Access (TDMA). TDMA is a channel access method that allows a number of base stations to perform multiple accesses via one router, so that they mutually communicate to each other by share the same frequency channel by dividing the signal into different time slots. TDMA may be classified synchronous TDMA and asynchronous TDMA. Synchronous TDMA is an access method where a time frame, as a basic period for transmitting/receiving a signal, has a fixed length. Synchronous TDMA allows all of the linked base stations to transmit data in time slots allocated thereto respectively. Asynchronous TDMA is an access method that controls assess rights possessed respectively by the base stations. TDMA is advantageous in that, when the base stations perform multiple accesses via one router, the router can be operated in a saturation region although the number of carriers is temporarily increased and the number of accessed base stations is thus increased.

The RF communication unit 110 that can be adapted to TDMA periodically consumes electric power during data transmission. The RF communication unit 110 can consume electric power that exceeds a certain level in order to search for base stations, output from the power amplifier module 120, irrespective of the SIM electric power supply 170.

The power amplifier module 120 is coupled to the electric power source 130. The power amplifier module 120 adjusts electric power, output from the electric power source 130, to the level to be consumed by respective components in the mobile device 100, and then supplies corresponding levels of electric power to the respective components. The power amplifier module 120 supplies electric power to the RF communication unit 110 while the mobile device 100 is being booted and the controller 160 is also searching for base stations via the RF communication unit 110. In addition, the power amplifier module 120 also supplies electric power to the controller 160 while the controller 160 is searching for base stations via the RF communication unit 110.

The electric power source 130 as a battery, stores energy, can be re-charged by electric power provided from the outside, and supplies electric power, created from the stored energy, to the mobile device 100. In an exemplary embodiment of the invention, the electric power source 130 is implemented with a battery, or a secondary battery, for example a Lithium ion cell, etc. The electric power source 130 supplies electric power to the power amplifier module 120 and the SIM electric power supply 170.

The display unit 140 displays menus, user's input information, and information provided to the user. The display unit 140 displays a variety of screens, for example, an idle screen, a menu screen, a message writing screen, a call screen, etc. The display unit 140 may be implemented with a Liquid Crystal Display (LCD), an Organic Light Emitting Diode (OLED), or any type of thin-film technology display. When the display unit 140 is implemented with a touch screen with a touch panel, it may also serve as an input mechanism. The display unit 140 can display a message stating whether the SIM 150 is installed to the mobile device 100. The display unit 140 displays a Received Signal Strength Indicator (RSSI) related to the operation of the RF communication unit 110. The display unit 140 can also display information regarding the operation of the RF communication unit 110, for example, an image when a call is being transmitted or received.

The Subscriber Identity Module (SIM) 150 is preferably shaped as an IC card. The SIM 150 may be installed to various types of mobile devices that can support mobile communication. The SIM 150 has an area to store subscriber information. The SIM 150 is preferably installed in a mobile device, and stores user functions of the mobile device in the subscriber information storing area.

Meanwhile, the mobile device 100 further includes a slot allowing for the installation of the SIM 150. When the SIM 150 is inserted in the slot, the electric power source 130 supplies electric power to the SIM electric power supply 170. The SIM electric power supply 170 supplies electric power to the SIM 150 inserted in the slot. For example, the SIM 150 performs an initialization process, and then communicates with the controller 160 by transmitting and receiving data required to the operation of the mobile device 100. During this process, the SIM 150 must continue to receive a certain amount of electric power from the SIM electric power supply 170. Otherwise, if electric power is not supplied to the SIM 150 or fluctuates, the SIM 150 may not smoothly communicate with the controller 160.

The SIM electric power supply 170 supplies electric power to the SIM 150 inserted in the slot. To this end, the SIM electric power supply 170 is coupled to the node between the electric power source 130 and the power amplifier module 120, so that it can continue to receive a certain amount of electric power from the electric power source 130. In an exemplary embodiment of the invention, the SIM electric power supply 170 includes a charging unit that can store a certain amount of energy, converted from the electric power that is supplied from the electric power source 130. Therefore, although the SIM electric power supply 170 receives varying levels of electric power from the electric power source 130, it can supply uniform electric power to the SIM 150, using the charged energy of the charging unit. The configuration of the SIM electric power supply 170 will be described later referring to FIG. 2.

The controller 160 controls the supply of electric power provided to the components in the mobile device 100 to perform the initialization. After completing the initialization, the controller 160 preferably controls the components in the mobile device 100 to supply stable electric power to the SIM 150. In particular, the controller 160 controls the SIM electric power supply 170 to supply stable electric power to the SIM 150.

With continued reference to FIG. 1, when the controller 160 receives electric power from the power amplifier module 120, it communicates with the SIM 150 inserted in the slot and then collects information to search for base stations. The controller 160 controls the RF communication unit 110 to search for base stations using the collected information. To this end, the power amplifier module 120 supplies a certain amount of electric power, required for the base station searching process, to the RF communication unit 110. When the RF communication unit 110 is operated to support TDMA, a voltage drop occurs periodically in electric power supplied from the power amplifier module 120. While the controller 160 is searching for base stations via the RF communication unit 110, the controller consumes larger amount of electric power than when performing general operations, such as a process for retaining a channel in a satisfactory channel environment. In other words, a voltage drop may occur in electric power supplied from the power amplifier module 120, according to the operational conditions of the RF communication unit 110. Therefore, this may cause a voltage drop, equal to or greater than a value in electric power than the power that power amplifier module 120 receives from the electric power source 130, periodically, according to the operation conditions of the RF communication unit 110. In addition, since the SIM electric power supply 170 is coupled to the electric power source 130, it may be subjected to the voltage drop described above.

The controller 160 can periodically control change and discharge levels in the SIM electric power supply 170 in order to supply electric power supplied to the SIM 150, equal to or greater than a preset level when the voltage drop occurs, so that the SIM 150 can receive uniform electric power. The operation of the SIM electric power supply 170 will be described later referring to FIG. 3.

Figure 2:
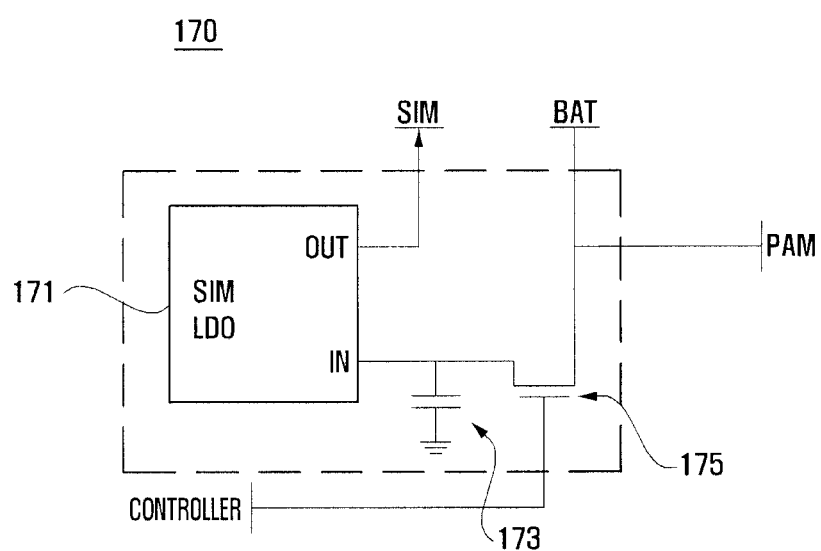
FIG. 2 illustrates a detailed view of the SIM electric power supply in the mobile device show in FIG. 1.

FIG. 2 illustrates a detailed view of the SIM electric power supply 170 in the mobile device show in FIG. 1.

Referring now to FIG. 2, the SIM electric power supply 170 preferably includes a charging unit 173, a switch 175, and a SIM Low DropOut (SIM LDO) 171.

The switch 175 is arranged electrically between the SIM LDO 171 and the electric power source 130 or power amplifier module 120. The electric power source 130 and the power amplifier module 120 are coupled to each other via an electric power supply cable. The switch 175 is coupled to the electric power supply cable or the electric power source 130. The switch 175 is actuated according to the control of the controller 160. To this end, the switch 175 is configured in such a way that the gate is coupled to the controller 160, and the drain and the source are located between the electric power supply cable and the SIM LDO 171.

The charging unit 173 is coupled between the SIM LDO 171 and the switch 175. The charging unit 173 is coupled in parallel to the switch 175. In an exemplary embodiment of the invention, the charging unit 173 includes a capacitor with a certain capacity that can store charge. When the switch 175 is in a turned-on state and the electric power source 130 supplies electric power to the SIM LDO 171, the charging unit 173 is charged. When the switch 175 is in a turned-off state, the charging unit 173 supplies charged electric power to the SIM LDO 171. As such, the charging unit 173 can repeat the actions of charging and discharging to supply charged electric power, according to the turning on and off operations of the switch 175.

With continued reference to FIG. 2, the SIM LDO 171 is coupled between the SIM 150 and the switch 175. When the switch 175 is in a turned-on state, the SIM LDO 171 receives electric power from the electric power source 130 and then supplies a corresponding level of electric power to the SIM 150. When the switch 175 is in a turned-off state, the SIM LDO 171 receives electric power from the charging unit 173 and then supplies a corresponding level of electric power to the SIM 150. The SIM LDO 171 has an input pin IN, coupled to the switch 175, and an output pin OUT, coupled to the SIM 150.

Figure 3:
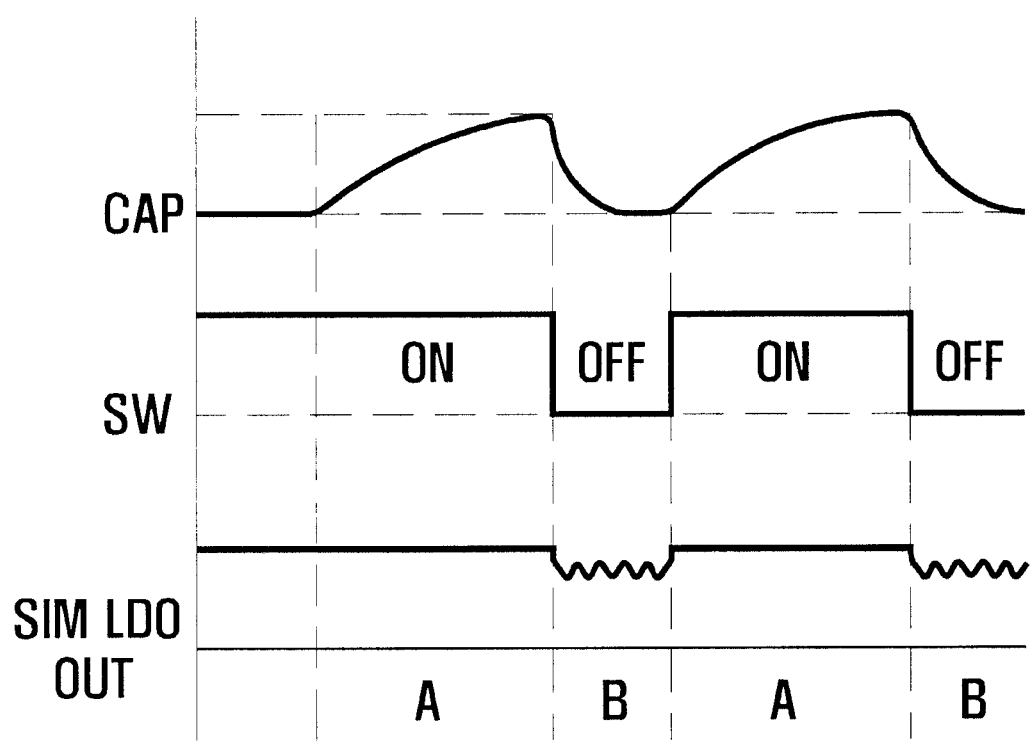
FIG. 3 illustrates waveforms that describe the operation of the SIM electric power supply according to an exemplary embodiment of the invention.

FIG. 3 illustrates waveforms that describe the operation of the operation of the SIM electric power supply 170 according to an exemplary embodiment of the invention.

Referring now to FIG. 3, when the electric power source 130 allows for the installation of a battery or is coupled with an electric power supply cable, the power source 130 can supply electric power to the mobile device 100. The electric power source 130 supplies electric power to the power amplifier module 120 and the SIM LDO 171. In particular, the electric power from the electric power source 130 can be provided to the SIM LDO 171 via the switch 175, so the switch 175 must be operated in a state where current can flow, for example, a turned-on state. The switch 175 is turned on and off according to the control of the controller 160. For example, the switch 175 may be implemented with a P-type switch that retains a turned-on state without receiving a control signal and transits to a turned-off state when it receive a control signal. On the contrary, when the switch 175 is implemented with an N-type switch, it can be activated according to the control of the controller 160 after the controller 160 has completed an initialization operation via the electric power from the amplifier module 120.

As shown in the graph of FIG. 3, when the switch 175 is operated in a turned-on state in section (time interval) 'A,' the electric power source 130 supplies electric power to the charging unit 173 and the SIM LDO 171 via the switch 175. In that case, the charging unit 173 is charged via the electric power. The SIM LDO 171 receives the electric power and then supplies a corresponding level of electric power to the SIM 150.

The power amplifier module 120 receives electric power from the electric power source 130, and then supplies it to the controller 160, the RF communication unit 110, etc. When the mobile device 100 has been completely booted, and the RF communication unit 110 consumes electric power that is equal to or greater than a certain level, in order to search for base stations. For example, the RF communication unit 110 performs the first search for base stations by consuming a preset level of electric power, or by using one of the electric power levels that the RF communication unit 110 has available. The preset level of electric power to search for base stations is relatively higher than the other levels of electric power. The RF communication unit 110 can search for base stations, consuming a relatively higher level of electric power. The power amplifier module 120 can supply a relatively higher level of electric power to the RF communication unit 110 for a certain period of time. This ability allows the RF communication unit 110 to consume most of the electric power provided from the electric power source 130. Since the electric power source 130 has a limited capacity for supplying electric power, when the power amplifier module 120 uses most of the electric power of the electric power source 130, the electric power source 130 reduces electric power to be supplied to the SIM LDO 171.

In the above case, as shown in section 'B' illustrated in FIG. 3, the controller 160 turns off the switch 175, so the charging unit 173 discharges, or supplies its stored electric power to the SIM LDO 171. When the SIM LDO 171 receives electric power from the charging unit 173, it can provide uniform electric power to the SIM 150. The base station search by the controller 160 is temporarily and repeatedly performed, i.e., it is not an operation to continue consuming electric power. Therefore, when the RF communication unit 110 searches for base stations, the controller 160 turns off the switch 175 in section 'B' as shown in FIG. 3. While the RF communication unit 110 does not perform transmission of a signal to search for base stations, the controller 160 turns on the switch 175. As described above, according to the control of the controller 160, the switch 175 repeats turning on and off operations in section 'A' and section 'B,' and this allows the charging unit 173 to repeatedly and alternatively perform the charging and discharging operations. While there is a slight amount of ripple in B, the voltage level supplied by the discharge remains above a preset threshold.

When the RF communication unit 110 has finished searching for a base station, the base station transmits a signal required for retaining the search operation and the channel to the mobile device 100. In such a case, the mobile device 100 consumes electric power only while it transmits a replay signal to the base station. Therefore, the mobile device 100 can retain the channel with the base stations, by consuming a relatively lower level of electric power than it allows the RF communication unit 110 to search for base stations. That is, after searching for a base station, the mobile device 100 can retain a communication channel while consuming a relatively low level of electric power. Therefore, the power amplifier module 120 does not require a great deal (i.e. a large amount) of electric power from the electric power source 130. This allows the electric power source 130 to stably supply electric power to the power amplifier module 120 and the SIM LDO 171. During this process, the controller 160 retains the switch 175 in a turned-on state, so that the SIM LDO 171 can normally operate irrespective of the charging unit 173.

The mobile device 100 may be designed to automatically adjust levels of electric power required for the operation of the RF communication unit 110 according to the channel environment. In particular, when the channel environment is in an unstable state, the mobile device 100 can increase levels of electric power step-by-step or at once, and can then transmit signals at a higher level of electric power. When the mobile device 100 is located in an area where the channel environment is weak, the mobile device may consume a relatively higher level of electric power. In such an environment, the power amplifier module 120 draws and consumes as much electric power from the electric power source 130 as when the base station searching operation is performed during the booting process. In that case, the SIM LDO 171 cannot receive a suitable level of electric power from the electric power source 130. Accordingly, the controller 160 controls the switch 175 to break the path for supplying electric power between the SIM LDO 171 and the electric power source 130, and then controls the charging unit 173 to supply its charged electric power to the SIM LDO 171. This control operation of the controller 160 is not terminated until the channel environment of the mobile device 100 improves.

The controller 160 can control the time points for turning on and off the switch 175, via the sensitivity of a signal received by the RF communication unit 110. Alternatively, the controller 160 can also control the time points for turning on and off the switch 175 when a level of signal transmission power exceeds a certain value. For example, when a mobile device is designed such that, when it receives a signal in a certain level of electric power and then does not receives a reply signal in a preset period of time, the mobile device increases the level of electric power and then re-transmits the same signal, the controller 160 detects the number of transmission retries for the same signal or the level of electric power required to transmit the signal, then compares the number of retries with a preset value, and then turns the switch 175 on or off.

As described above, the mobile device 100 allows the electric power source 130 to stably supply electric power to the SIM 150 while the electric power source 130 is supplying electric power to other components. Therefore, the mobile device 100 can retain normal data communication between the controller 160 and the SIM 150, thereby preventing recognition failure of the SIM 150 according to an unstable supply of electric power. For example, the mobile device 100 can prevent an 'Unlock' caused by the recognition failure of a SIM.

In the foregoing description, the configuration and operations of the components in the mobile device 100 have been explained. The following description provides a method for controlling the electric power supply in the mobile device 100 referring to FIG. 4.

Figure 4:
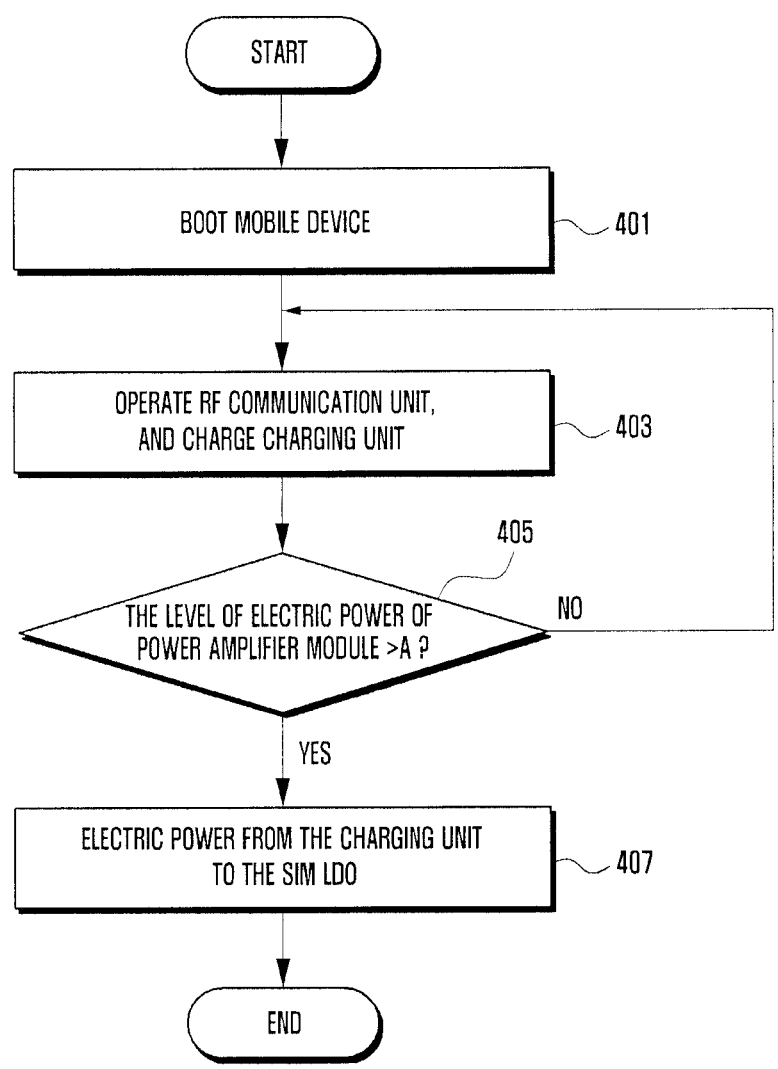
FIG. 4 illustrates a flow chart that describes a method for controlling electric power according to an exemplary embodiment of the invention.

FIG. 4 illustrates a flow chart that illustrates exemplary operation of a method for controlling electric power in a mobile device 100 according to an embodiment of the invention.

Referring now to FIG. 4, at (401), when the mobile device 100 is turned on, so that the electric power source 130 supplies corresponding levels of electric power to the components, the controller 160 performs a booting process. In the booting process, the controller 160 loads the OS from the storage unit and then operates the components based on the enabled OS. The time point of supplying electric power from the electric power source 130 may be a time point when a preset key is operated in the mobile device 100 after the electric power source 130, i.e., a battery, is installed to the mobile device 100, or a time point when a key for turning on the mobile device 100 is operated after an electric power supply cable is coupled to the mobile device 100.

After completing the booting process at step 401, at 403 the controller 160 initializes the components in the mobile device 100. In an exemplary embodiment of the invention, the controller 160 performs an initializing process to operate the RF communication unit 110 and controls the SIM electric power supply 170 to charge the charging unit 173. Since the charging unit 173 is coupled to the electric power source 130 via the switch 175, the charging unit 173 can be charged by electric power provided from the electric power source 130. To this end, the switch 175 may be implemented as a type that can be turned on without any control signal. On the other hand, when the switch 175 is implemented as a type of switch that is turned on when receiving a control signal, it can be activated after the controller has completed the booting process. In that case, the charging unit 173 can be charged after the controller 160 has completed the booting process. Therefore, charging the charging unit 173 at step 403 may be performed before booting the mobile device 100 at step 401 or during the booting process.

The controller 160 can establish a communication channel via the RF communication unit 110. The controller 160 communicates with the SIM 150 and collects information to establish a channel. To this end, the SIM 150 requires electric power. The SIM LDO 171 receives electric power from the electric power source 130 and supplies a proper level of electric power to the SIM 150.

With continued reference to FIG. 4, at (405) the controller 160 searches for base stations via the RF communication unit 110. The controller 160 determines whether a level of electric power used by the RF communication unit 110 is greater than a preset value 'A.' That is, at (405) the controller 160 determines whether the level of electric power provided from the power amplifier module 120 is greater than a preset value 'A'. When the controller 160 ascertains that the level of electric power provided from the power amplifier module 120 is equal to or less than a preset value 'A' at step 405, it returns to and proceeds with step 403.

On the other hand, at step (405) when the controller 160 ascertains that the level of electric power provided from the power amplifier module 120 is greater than a preset value 'A' at step 405, at (407) supplies the electric power from the charging unit 173 to the SIM LDO 171.

The level of electric power provided from the power amplifier module 120 can be determined as greater than a preset value 'A' at step 405 since the mobile device 100 is designed to use the RF communication unit 110. That is, the mobile device 100 may be designed in such a manner that it can transmit a signal with a level of electric power that exceeds a preset value 'A' for example, the highest level provided by the mobile device 100, at a time point when the controller 160 first perform the base station search via the RF communication unit 110. In that case, when the controller 160 ascertains that the level of electric power provided from the power amplifier module 120 is greater than a preset value 'A' at step 405, it can perform step 407 described above. Alternatively, the mobile device 100 may also be designed in such a manner that the controller 160 increases a level of electric power, step by step or at once, according to the channel environment, and then searches for a base station via the RF communication unit 110. In that case, the power amplifier module 120 supplies electric power that exceeds a preset value 'A' at step 405.

In another exemplary embodiment of the invention, the method of FIG. 4 may be modified in such a manner that step 405 of FIG. 4, comparing levels of electric power, may be replaced with another feature. That is, the controller 160 detects a time point that the mobile device 100 is turned on and perform a base station searching process, without comparing a level of electric power, provided from the power amplifier module 120, with a preset value 'A,' and then controls the charging unit 173 and the switch 175 to stably supply electric power to the SIM LDO 171 at the time point, as step 407 of FIG. 4. In addition, when the controller 160 ascertains that a level of received signal related to a channel environment is equal to or less than a preset value while the mobile device 100 is being operated, it controls the charging unit 173 and the switch 175 to supply electric power to the SIM LDO 171. In other words, the comparison of a level of electric power at step 405 of FIG. 4 may be replaced with another feature, such as comparing strength of a received signal with a preset value, detecting the number of transmission retries for the same signal, or changing levels of electric power of the same transmitted signal. It should be understood that the electric power control method of the invention is not limited to the embodiments described above. Accordingly, step 405 may be implemented with one of them or a combination thereof according to the manufacturer's setting or a user's settings.

Although the electric power control method and the mobile device 100 adapted thereto, according to the invention, stably supply electric power to the SIM by operating the RF communication unit 110, it should be understood that the invention is not limited to the present exemplary embodiment. For example, when the electric power control method and the mobile device 100 adapted thereto detects that a level of electric power provided from the power amplifier module 120 is equal to or greater than a preset value, they control the switch 175 of the SIM electric power supply 170 to supply stable electric power to the SIM 150, thereby perform a variety of user functions. The mobile device 100 of the invention preferably detects a level of electric power from the SIM LDO 171, not a level of electric power from the power amplifier module 120. When the level of electric power from the SIM LDO 171 is equal to or less than a preset value, the mobile device 100 preferably controls the switch 175 to supply stable electric power to the SIM 150.

The electric power control method of the invention preferably includes: supplying electric power from an electric power source to a Subscriber Identity Module (SIM) and changing a charging unit located between the electric power source and the SIM; detecting a voltage drop occurring in the electric power supplied to the SIM; and supplying the charged electric power to the SIM according to the occurrence of a voltage drop. Detecting the occurrence of a voltage drop comprises at least one of the following: lowering a level of electric power supplied to the SIM to a level equal to or less than a preset value; increasing a level of electric power supplied from the power amplifier module to a level equal to or greater than a preset value; searching first for a base station via a RF communication unit; lowering strength of a received signal of the RF communication unit to a value equal to or less than a preset value; repeatedly transmitting the same signal over a preset number via the RF communication unit; and exceeding a transmission power level of the same signal over a preset value via the RF communication unit.

Figure 5:
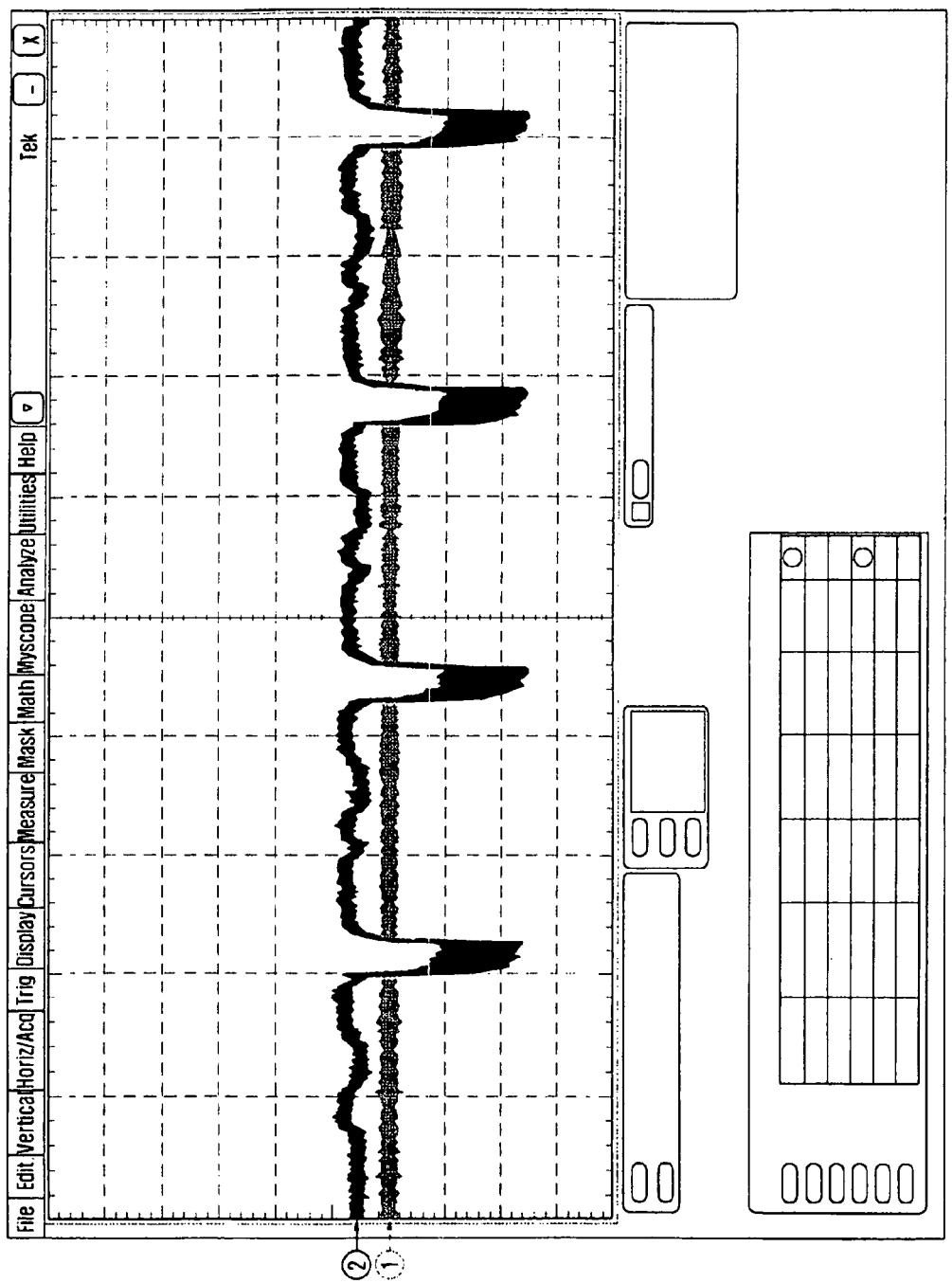
FIG. 5 illustrates a waveform of electric power supplied from the SIM electric power supply to the SIM in a conventional mobile device.
Figure 6:
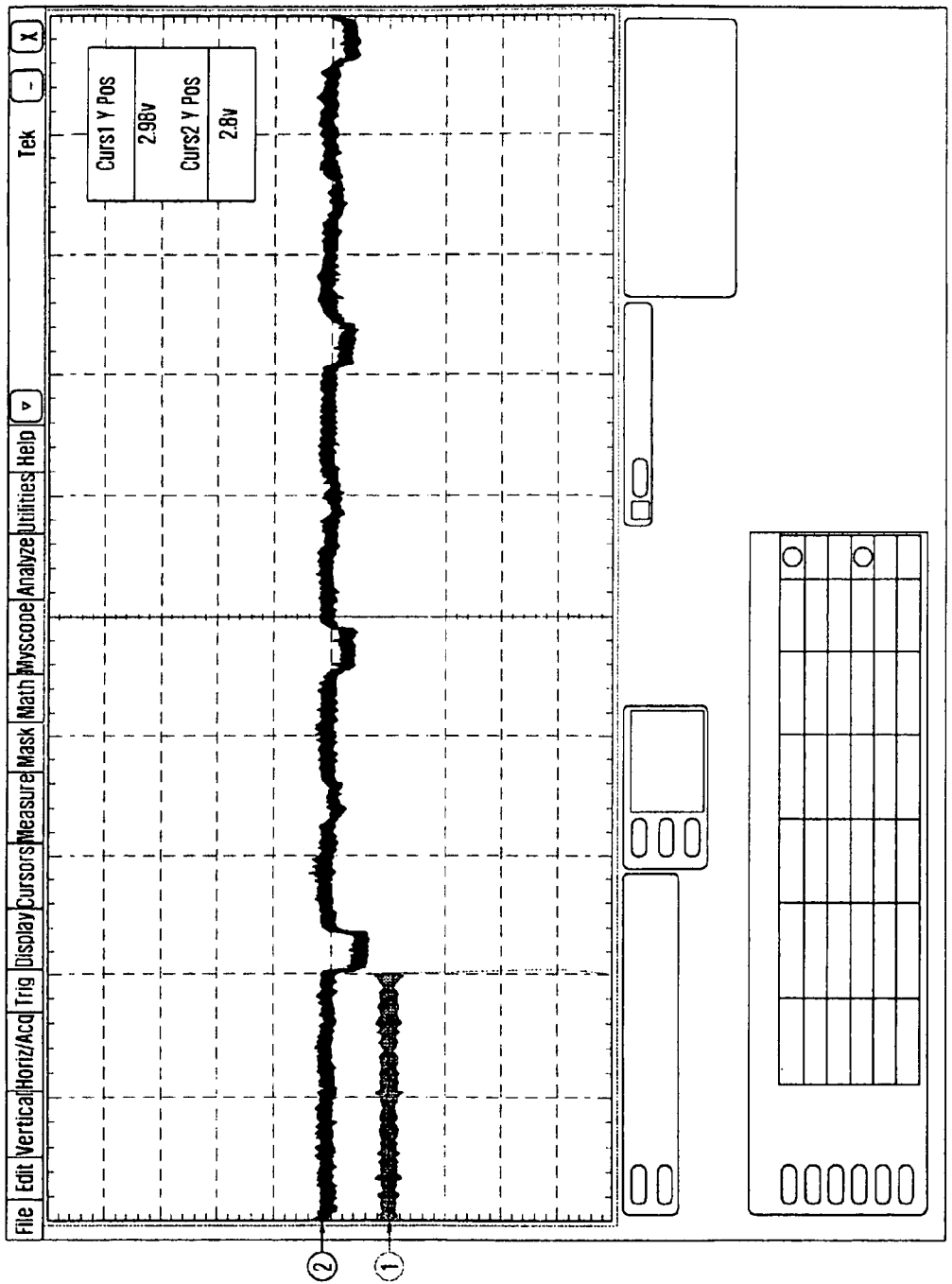
FIG. 6 illustrates a waveform of electric power supplied from the SIM electric power supply to the SIM in a mobile device according to an exemplary embodiment of the invention.

FIG. 5 illustrates a waveform of electric power supplied from a SIM electric power supply to a SIM in a conventional mobile device, captured via an electronic test instrument. FIG. 6 illustrates a waveform, captured via an electronic test instrument, of electric power supplied from the SIM electric power supply 170 to the SIM 150 in a mobile device 100 according to an exemplary embodiment of the invention.

As illustrated in FIG. 5, the waveform shows that a voltage drop occurs in a SIM electric power supply according to the operation of an RF communication unit. Therefore, the SIM electric power supply cannot supply uniform electric power to a SIM. This creates unstable communication between the SIM and the controller, thereby causing the conventional mobile device to malfunction.

In contrast, the mobile device 100 of the invention is configured in such a manner that the SIM LDO 171 and the charging unit 173 of the SIM electric power supply 170 can supply uniform electric power to the SIM 150 irrespective of a voltage drop, as shown by the waveform illustrated in FIG. 6. Therefore, the mobile device 100 can guarantee stable communication between the SIM 150 and the controller 160.

Although the exemplary embodiment of the invention in the foregoing description was not explained in detail, it should be understood that the mobile device 100 may further include additional components according to a user's selection, for example, an input unit, an audio processing unit, a storage unit, etc.

The input unit preferably includes input keys and function keys that allow a user to input numbers or letter information and to set a variety of functions. The function keys include direction keys, side keys, shortcut keys, etc., which are set to perform specific functions. When the mobile device 100 is designed to employ a full-touch-screen, it may include only a side key as an input unit on one side of the case, without a key button or a keypad. The full-touch-screen includes a display unit for displaying a key map with a number of key icons and a touch panel related to the key map. The input unit creates signals according to a user's inputs, for example, an input signal for providing electric power to the electric power source 130 to the mobile device 100, and transfers them to the controller 160.

The audio processing unit preferably includes a speaker and a microphone. The audio processing unit outputs, via the speaker, audio data that is transmitted during the call, is included in a received message, and is created when an audio file stored in the storage unit is played back. The audio processing unit receives a user's voice or audio signals during the call via the microphone.

The storage unit preferably stores applications related to the operations according to the invention. The storage unit stores a key map for operating a touch screen, optionally when the mobile device 100 includes a touch screen. The storage unit is comprised of a program storage area and a data storage area.

The program storage area stores an operating system (OS) for booting the mobile device 100 and operating the components included therein. The program storing area also stores application programs for reproducing a variety of files, such as an application program for supporting a voice call function, a web browser function for accessing an Internet server, an application program for audio sources, such as an MP3 file, an application program for reproducing photographs, images, moving images, etc. In an exemplary embodiment of the invention, the program storage area stores a program for controlling the SIM electric power supply.

The SIM electric power supply control program preferably includes routine programs for turning the switch 175 on or off, according to levels of electric power that the power amplifier module 120 supplies to the RF communication unit 110. That is, the SIM electric power supply control program includes a routine program for turning the switch 175 on or off while the mobile device 100 is turned on and is performing a booting process. The SIM electric power supply control program also includes a routine program for turning the switch 175 on or off when detection is made that a level value related to a channel environment of the mobile device 100 is decreased to a preset value. To this end, the SIM electric power supply control program includes at least one of a routine program for detecting a level of electric power of the power amplifier module 120, a routine program for determining whether a base station search is performed via the RF communication unit 110, and a routine program for determining whether a level value related to a channel environment based on the RF communication unit 110 is equal to or less than a preset value.

The data storage area refers to an area where data, generated when the mobile device 100 is used, is stored. That is, the data storage area stores a variety of contents. The data storage area stores a preset value, as a reference value, to be used to control the switch 175 via the SIM electric power supply control program. The preset value can be transferred to the corresponding program according to the control of the controller 160.

Although the drawings do not illustrate such a configuration, the mobile device according to the present invention may be configured to selectively further include units having add-on functions as follows: a short-range communication module for short-range wireless communication; a camera module for photographing a subject/subjects to create still images or moving images; an interface for wireless or wiredly transmitting/receiving data; an Internet communication module for performing communication via the Internet; and a digital broadcast module for receiving and reproducing broadcast. With the spread of digital convergence, although the mobile device are too various to list their modifications in this description, it will be easily appreciated to those skilled in the art that the other units equivalent to the above-listed units may be further included to the mobile device according to the invention. Also, it will be appreciated that, according to the purposes, the mobile device may be implemented by omitting a particular element or replacing it with other elements.

The mobile device 100 according to the invention includes all information communication devices, multimedia devices, and their applications, which include an SIM and an SIM electric power supply and are operated according to communication protocols corresponding to a variety of communication systems. For example, the mobile device 100 can be applied to mobile communication terminals, Portable Multimedia Players (PMPs), digital broadcast players, Personal Digital Assistants (PDAs), audio players (e.g., MP3 players), mobile game players, smart phones, laptop computers, handheld PC, etc.

As described above, the electric power control method of the invention advantageously provides a stable supply electric power to a mobile device, thereby making the mobile device show the more robust feature in various wireless environments.

Although exemplary embodiments of the invention have been described in detail hereinabove, it should be understood by a person of ordinary skill in the art that many variations and modifications of the basic inventive concept herein described, which may be apparent to those skilled in the art, will still fall within the spirit and scope of the exemplary embodiments of the invention as defined in the appended claims.

What is claimed is:

1. A mobile device comprising:
   a power amplifier module for receiving and distributing electric power;
   a Subscriber Identity Module (SIM) being coupled to the power amplifier module;
   a SIM electric power supply for receiving electric power and outputting it to the SIM in which the SIM electric power supply comprises:
      a switch coupled to a node between a means for coupling with an electric power source and the power amplifier module; and
      a SIM Low DropOut (SIM LDO) via which the switch and the SIM are coupled to each other;
   a controller for communicating with the SIM and providing user functions, said controller receiving electric power output from the power amplifier module;
   a charging unit coupled to the SIM electric power supply, said charging unit for storing a predetermined amount of electric power output received by the SIM electric power supply, and for providing at least a portion of the stored electric power to the SIM according to a state of the switch, wherein the charging unit is coupled in parallel to the switch; and
   a radio frequency (RF) communication unit for establishing a communication channel with one or more base stations, wherein the controller is configured to control time points for turning on and off the switch via the sensitivity of a signal received by the RF communication unit.

2. The mobile device of claim 1, wherein the state of a SIM comprises state of an input level of voltage thereto.

3. The mobile device of claim 1, wherein the controller supplies electric power stored in the charging unit to the SIM at one of the states where a level of electric power supplied to the SIM is equal to or less than a preset value and where a level of electric power supplied from the power amplifier module is equal to or greater than a preset value.

4. The mobile device of claim 1,
wherein the controller supplies electric power stored in the charging unit to the SIM while the controller first performs a base station searching process via the RF communication unit.

5. The mobile device of claim 1, further comprising:
an RF communication unit for establishing a communication channel with one or more base stations,
wherein the controller supplies electric power stored in the charging unit to the SIM when a strength of a signal received by the RF communication unit is equal to or less than a preset value, or
a number of transmission retries for the same signal by the RF communication unit is equal to or greater than a preset value, or a power level of the same signal transmitted by the RF communication unit is equal to or greater than a preset value.

6. The mobile device of claim 1, wherein the charging unit has a predetermined value of capacitance.

7. The mobile device of claim 1, wherein the charging unit is charged via electric power while the switch is turned on and discharges the electric power to the SIM LDO while the switch is turned off.

8. The mobile device of claim 1, further comprising:
a radio frequency (RF) communication unit for transmitting signals at a predetermined period of time in a TDMA mode,
wherein the controller turns the switch off during the signal transmission period when first searching for a base station via the RF communication unit, and turns the switch on while a signal is not being transmitted.

9. A method for controlling electric power in a mobile device, comprising:
establishing a communication channel with one or more base stations by an RF communication unit;
receiving RF signals by the RF Commination unit;
receiving and distributing electric power by a power amplifier module;
coupling a Subscriber Identity Module (SIM) to the power amplifier module;
receiving electric power by a SIM electric power supply and outputting it to the SIM,
wherein the SIM electric power supply comprises a switch coupled to a node between a means for coupling with an electric power source and the power amplifier module and a SIM Low DropOut (SIM LDO) via which the switch and the SIM are coupled to each other;
communicating with the SIM and providing user functions by controller, wherein the controller receives an electric power output from the power amplifier module;
coupling a charging unit to the SIM electric power supply, said charging unit storing a predetermined amount of electric power output received by the SIM electric power supply and providing at least a portion of the stored electric power to the SIM according to a state of the switch, wherein the charging unit is coupled in parallel to the switch; wherein the controller is configured to control time points for turning on and off the switch via the sensitivity of the RF signals received by the RF communication unit.

10. The method of claim 9, wherein detecting occurrence of a voltage drop further comprises detecting at least one of the following:
(i) a reduced level of electric power being supplied to the SIM at a level equal to or less than a preset value;
(ii) an increased level of electric power supplied from a power amplifier module to a controller and at least an RF communication unit at a level equal to or greater than a preset value;
(iii) a reduced strength of a received signal of the RF communication unit to a value equal to or less than a preset value;
searching first for a base station via the RF communication unit;
repeatedly transmitting a same signal for a preset number of transmissions via the RF communication unit; and
exceeding a preset value of the transmission power level of the same signal via the RF communication unit.

11. The method of claim 10, wherein charging a charging unit comprises:
charging a charging unit with electric power.

12. The method of claim 11, wherein supplying the charged electric power by the charging unit to the SIM comprises:
turning the switch off to break a circuit between the coupling to the electric power source and the SIM.

13. The method of claim 12, wherein supplying the charged electric power by the charging unit to the SIM further comprises:
transmitting signals via an RF communication unit, according to a predetermined period of time when a base station is searched;
turning the switch off during the signal transmission period; and
supplying electric power from the charging unit to the SIM while the switch is turned off.

14. The method of claim 13, wherein charging a charging unit comprises:
turning the switch on during a period of time that the signal is not transmitted; and
charging the charging unit during a period of time that the switch is turned on.

* * * * *